US008638239B2

(12) United States Patent
Cases et al.

(10) Patent No.: US 8,638,239 B2
(45) Date of Patent: Jan. 28, 2014

(54) SYSTEM AND METHOD FOR MANAGING AUDIO WARNING MESSAGES IN AN AIRCRAFT

(75) Inventors: Fabien Cases, Toulouse (FR); Michel Colin, Colomiers (FR); Nicolas Caule, Toulouse (FR); Alexandre Broquet, Toulouse (FR); Fabien Pascal, Donneville (FR)

(73) Assignee: AIRBUS Operations S.A.S., Toulouse (FR)

( * ) Notice: Subject to any disclaimer, the term of this patent is extended or adjusted under 35 U.S.C. 154(b) by 341 days.

(21) Appl. No.: 13/014,297

(22) Filed: Jan. 26, 2011

(65) Prior Publication Data

US 2011/0193724 A1 Aug. 11, 2011

(30) Foreign Application Priority Data

Jan. 26, 2010 (FR) ..................................... 10 50524

(51) Int. Cl.

*G08B 21/00* (2006.01)
*G08B 23/00* (2006.01)
*G01C 21/00* (2006.01)
*G01C 5/00* (2006.01)
*G05D 1/00* (2006.01)
*G06F 7/70* (2006.01)
*G06F 19/00* (2011.01)

(52) U.S. Cl.

USPC ........... 340/945; 340/963; 340/969; 340/974; 701/9; 701/14

(58) Field of Classification Search

USPC ......... 340/539.13, 539.16, 539.22, 506, 7.59, 340/945, 963, 974; 701/9, 14

See application file for complete search history.

(56) References Cited

U.S. PATENT DOCUMENTS

| | | | | |
|---|---|---|---|---|
| 3,641,496 A * | 2/1972 | Slavin | ........................... | 704/274 |
| 4,121,287 A * | 10/1978 | Leal et al. | ..................... | 701/301 |
| 4,401,971 A | 8/1983 | Saito et al. | | |

(Continued)

FOREIGN PATENT DOCUMENTS

| | | |
|---|---|---|
| EP | 0 964 381 A2 | 12/1999 |
| FR | 2 918 206 | 1/2009 |
| FR | 2 918 207 | 1/2009 |

OTHER PUBLICATIONS

French Preliminary Search Report issued Sep. 28, 2010, in French 1050524, filed Jan. 26, 2010 (with English Translation of Category of Cited Documents).

*Primary Examiner* — Daniel Wu
*Assistant Examiner* — Mohamed Barakat
(74) *Attorney, Agent, or Firm* — Oblon, Spivak, McClelland, Maier & Neustadt, L.L.P.

(57) ABSTRACT

The present invention relates to a system (1) and an associated method for managing audio warning messages in an aircraft. The system (1) comprises a plurality of monitoring systems (10, 20) capable of detecting the establishment of at least one warning condition (CA), and comprises a central broadcasting module (40), to which each of the monitoring systems is connected and which is capable of broadcasting an audio message (SIG) corresponding to a detected warning condition.

In particular, in this system (1), the said central broadcasting module (40) comprises means (402, 420) for determining at least one priority warning condition among the warning conditions detected by the monitoring systems, and means (410, 430) for generating at least one audio message (SIG) corresponding to the at least one determined priority warning condition, in order to broadcast it.

12 Claims, 6 Drawing Sheets

(56) References Cited

U.S. PATENT DOCUMENTS

| | | | | |
|---|---|---|---|---|
| 4,635,030 | A * | 1/1987 | Rauch | 340/945 |
| 5,701,161 | A * | 12/1997 | Williams et al. | 348/468 |
| 6,002,347 | A * | 12/1999 | Daly et al. | 340/963 |
| 6,043,757 | A * | 3/2000 | Patrick | 340/963 |
| 7,081,834 | B2 * | 7/2006 | Ruokangas et al. | 340/945 |
| 7,383,105 | B2 * | 6/2008 | Conroy, Jr. | 701/3 |
| 7,437,241 | B2 | 10/2008 | Jung et al. | |
| 7,994,941 | B2 * | 8/2011 | Sorbier et al. | 340/963 |
| 8,049,644 | B1 * | 11/2011 | Oehlert et al. | 340/970 |
| 2009/0015437 | A1 * | 1/2009 | Campagne et al. | 340/945 |
| 2009/0015438 | A1 | 1/2009 | Sorbier et al. | |

* cited by examiner

Figure 1
(prior art)

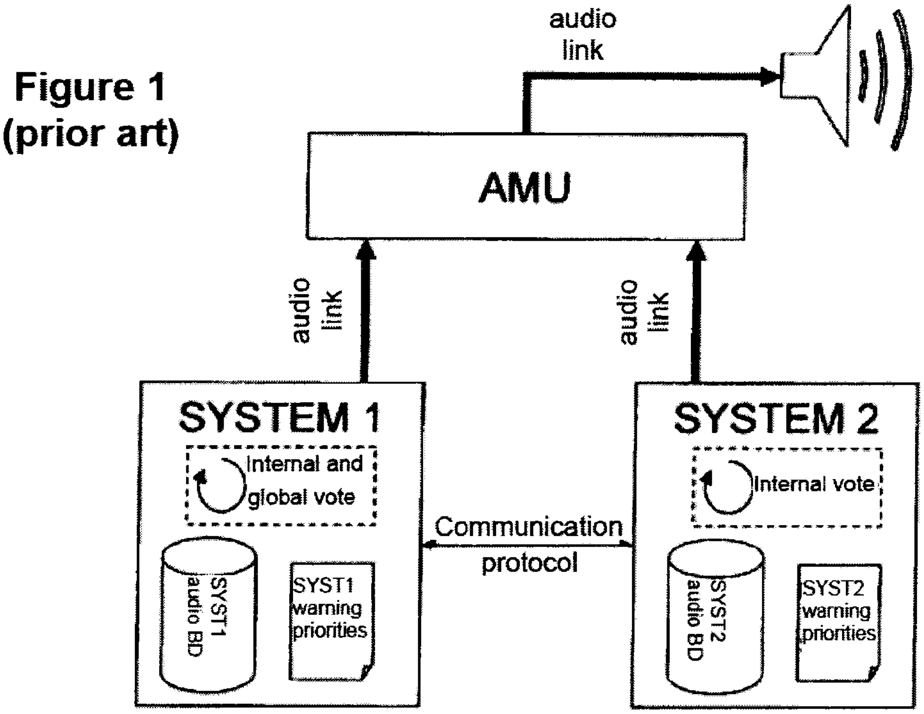

```
<CONFIGURATION>
    <WARNING id="1" title="Cricket Stall" owner="FWS">
            <PRIORITY>1</PRIORITY>
            <TYPE> Hybrid </TYPE>
            <STRUCTURE>
                        <ELEM_AURAL_MSG>STALL.WAV</ELEM_AURAL_MSG>
                        <ELEM_AURAL_MSG>STALL.WAV</ELEM_AURAL_MSG>
                        <ELEM_AURAL_MSG>SILENCE250MS.WAV</ELEM_AURAL_MSG>
                        <ELEM_AURAL_MSG>CRICKET.WAV</ELEM_AURAL_MSG>
                        <ELEM_AURAL_MSG>SILENCE250MS.WAV</ELEM_AURAL_MSG>
            </STRUCTURE>
            <TIMING>
                        <_DURATION>CONTINUE</DURATION>
                        <_PERIOD>0</PERIOD>
            </TIMING>
            <AUTHORIZED_LEVELS id="1">
                        <LEVEL id="1">0dB</LEVEL>
                        <LEVEL id="2">-12dB</LEVEL>
                        <LEVEL id="3">-6dB</LEVEL>
                        <LEVEL id="4">+6dB</LEVEL>
            </AUTHORIZED_LEVELS>
            <RADIO_PRIORITY> High </RADIO_PRIORITY>
    </WARNING>
    <WARNING id="2" ...>
...
</CONFIGURATION>
```

421

420

Figure 3

SYSTEM AND METHOD FOR MANAGING AUDIO WARNING MESSAGES IN AN AIRCRAFT

The present invention relates to a system and an associated method for managing audio warning messages in an aircraft.

In an aircraft cockpit, different monitoring systems are in charge of emitting warning messages in case of detection of an abnormal situation for the purposes of warning the crew.

These systems together constitute a global alarm system: an on-board system intended to warn the crew members of an abnormal situation concerning the airplane (sideslip, overspeed) or a monitored system of the airplane.

The monitored systems may include detectors or computers relating, for example, to the engines, to the fuel tanks or to the landing gear.

An example of a monitoring system is the system for monitoring flight conditions (or FWS for "Flight Warning System"). This system produces warnings, for example, when the flight conditions are abnormal, and it can also emit automatic altitude announcements when the airplane crosses certain altitude ranges.

Other monitoring systems have the function of warning the crew of risks related to the environment of the aircraft. In particular, there will be cited the TAWS system ("Terrain Awareness and Warning System" or system for notification and warning of impact), the TCAS system ("Traffic Collision Avoidance System" or on-board anti-collision system, also referred to as ACAS), the WxR system ("Weather Radar" or meteorological radar) and the PWS system ("Predictive Windshear System", a system for predicting shear).

It is possible to have a certain level of integration between these different systems.

These different monitoring systems, regardless of whether their function is to monitor a system of the aircraft or the environment thereof, communicate with the crew by warning messages, which may include the display of text messages on screens, the lighting of indicator lights in the cockpit, the generation of tactile warnings (joystick vibration, for example) and the emission of audio messages.

In this last case, the audio messages may be simple sounds (to attract the attention of the pilots), may be composed of voice syntheses (to give information to the pilots) or may be a "hybrid" combination of sounds and voice syntheses.

In particular, there are known the publications FR2918206 and FR2918207, which describe a system for managing audio warning messages in an aircraft, which system comprises a plurality of monitoring systems capable of detecting the establishment of at least one warning condition and comprises a central broadcasting module to which each of the monitoring systems is connected and which is capable of broadcasting an audio message corresponding to a detected warning condition. This prior art system is illustrated in particular by FIG. 1.

In this management system, each monitoring system (System 1 and System 2) comprises an electronic audio card for generating an audio message according to a detected warning condition, as well as an analog audio output intended for the central broadcasting module, referred to here as AMU ("Audio Management Unit"), by way of analog cables.

The audio messages are generated in particular from a database specific to each monitoring system. This database defines the sound and/or the voice synthesis corresponding to each possible warning condition. In particular, the voice synthesis is defined as a succession of elementary audio recordings.

In this way the central broadcasting module AMU receives audio messages directly from the monitoring systems, and acts simply as a relay intended to amplify the received audio message in order to propagate the sound to the sound boxes (speakers) of the cockpit.

Since the different monitoring systems are independent, it is possible to encounter a situation in which several audio messages are generated at the same time. So as not to make the different audio messages unintelligible, it is necessary to control the manner in which they are generated. That may be achieved by the following rule: only one monitoring system at a time may send an audio message to the central module for the purposes of broadcasting it to the crew. The hybrid warning is an exception to this rule: simultaneous emission of a sound and of a voice synthesis, the superposition of which is deemed to be comprehensible to humans.

A protocol for communication between the monitoring systems, based on the communication network of the airplane, is then employed to control the emission of a message by each monitoring system. These systems inform a decider monitoring system of the maximum priority level among the warning conditions detected by each of them (internal prioritization process in each monitoring system). An example of priorities is given in the aforementioned publication FR2918206.

The authorization to emit is given to the monitoring system that has detected the warning condition of highest priority (process at the airplane level for prioritization between the different monitoring systems). In this publication, it is the flight warning system FWS that plays a central role in authorizing or prohibiting the generation of an audio warning message by an AESS system ("Aircraft Environment Surveillance System" or system for monitoring the environment of the aircraft, grouping the TCAS, TAWS and WxR systems, for example).

By design, it is possible for two audio messages to be superposed during a given broadcast, especially a sound together with a voice synthesis.

However, this prior art system for managing audio messages has several disadvantages, related in particular to these features.

In the first place, the presence of analog audio cables constitutes a multiple handicap.

In fact, since the aircraft is made up of a large number of equipment items grouped together in little space, the analog cables must follow special routes, which are difficult to determine, in order to reduce as much as possible the presence of interferences with other equipment items, which could degrade the transmitted signal. In particular, these special routes are subject to spatial segregation constraints that may be as large as 200 mm between two cables, thus leading to extensive use of space by cables in the layout of the aircraft.

Furthermore, these audio cables are specific, and their maintenance must follow specific protocols. Since the analog signal is not deterministic by nature, it is difficult to monitor these connections to detect a fault in the event of malfunction.

Moreover, the cabling of the audio outputs represents a length of several meters between each monitoring system and the central broadcasting module. These cables therefore contribute to the weight burden of the aircraft.

Secondly, the presence of at least one electronic audio card in each monitoring system leads to an increase of the cost of these systems.

Thirdly, the protocol necessary for the dialog between the different monitoring systems is not simple to develop, especially because it is strongly related to the internal architecture of each of these systems. In addition, this complexity makes the system that employs this protocol poorly adaptable, especially for integration of a new monitoring system.

Finally, the addition of new warning conditions and therefore of new audio warning messages is relatively complex and costly, by reason in particular of the need to modify the computer code of each of the monitoring systems in question.

The present invention seeks to alleviate at least one of these disadvantages.

To this end, the invention proposes that the said central broadcasting module comprise means for determining at least one priority warning condition among the warning conditions detected by the monitoring systems, and means for generating at least one audio message corresponding to at least one determined priority warning condition, in order to broadcast it.

According to the invention, it is therefore provided that operations of prioritization of warnings and of generation of sounds and voice syntheses take place at a single equipment item. In particular, the prioritization of warnings may be achieved on the basis of presentation rules predefined within the central broadcasting module, in contrast to the prior art solutions in which these presentation rules are duplicated in each of the monitoring systems so that they communicate the warning condition of highest priority detected by them to the monitoring system employing the protocol.

In this way, the need for audio cables between each of the monitoring systems and the central broadcasting module is eliminated, as is the presence of electronic cards for generating audio in each of the monitoring systems. Consequently, the constraints of installation (segregation, interferences) of the system in the aircraft are alleviated, the costs of monitoring systems and the overall weight of the aircraft are reduced.

Furthermore, since the prioritization process is now centralized in the central broadcasting module, there is no longer any reason to resort to a protocol of exchanges between the different monitoring systems. Among other things, it makes it possible to simplify the integration of new monitoring systems and to simplify the addition or modification of warning conditions or of audio messages. In addition, the protocol of exchange between the monitoring systems and the central broadcasting module can be simple and therefore can be rapidly developed and/or adapted.

It will also be noted that, by centralizing the generation of audio messages (especially of voice syntheses) in the single broadcasting module, it is possible from now on to personalize these messages more easily. In fact, it is possible to store several audio databases containing elementary recordings forming a part of audio messages in this same central module, each base containing recordings in a particular language, for example, or in a masculine/feminine gender of voice. Consequently, simple programming of the broadcasting module makes it possible to switch easily from a mode that is a function of language or gender to the other.

In one embodiment, the central broadcasting module comprises at least one configuration file that associates, for each one among the warning conditions capable of being detected by the monitoring systems:

- an identification information item for this warning condition,
- an audio definition of a message for generating an audio message corresponding to this warning condition, and
- a priority information item, on the basis of which the central broadcasting module makes the determination of the priority warning condition.

By "configuration file" there is understood here any collecting of configuration information items, which equally well can assume the form, for example, of an electronic file of XML type or equivalent, or of a database.

Furthermore, by "audio definition", there is understood a set of information items that makes it possible either to synthesize a voice message or to compose an audio message on the basis of elementary audio recordings or to combine the two. For example, an audio definition may consist of an ordered list of elementary audio recordings whose concatenation makes it possible to compose a unique audio message.

In the configuration of the invention described hereinabove, the definition of each warning condition is therefore centralized in a single equipment item of the management system, which simplifies, in particular, the processing operations preformed in each of the monitoring systems. In fact, the latter are able to communicate only the identification of a detected warning condition.

In particular, the central broadcasting module comprises a plurality of configuration files associated respectively with each monitoring system. In this way it is easy to modify each of these monitoring systems independently, or even to add a new system, in which case it is sufficient to load a corresponding new configuration file and the missing sounds, and to define the corresponding priorities. As a variant, a single configuration file may be provided for all of the monitoring systems.

According to one characteristic of the invention, the said monitoring systems are arranged to send, to the central broadcasting module, via a digital communication means, at least one broadcast request comprising an identification information item for a detected warning condition.

In this configuration, it is clearly apparent that the invention is free from the presence of audio cables, since only digital communication between the monitoring systems and the central broadcasting module is necessary from now on. In particular, this digital communication is not very costly and it may be achieved in multiplexed manner for all monitoring systems over the same digital communication link, especially the already existing communication network of the airplane. This results in a considerable saving in terms of cabling of the airplane, as well as a possibility of detecting faults over the links between each monitoring system and the central broadcasting module.

According to a particular characteristic, the central broadcasting module determines the at least one priority warning condition from priority information items corresponding to the identification information items received from the monitoring systems.

In one embodiment of the invention, the said at least one configuration file associates, with each warning condition, an information item relating to the nature of the corresponding audio message. By way of example, a sound, a voice synthesis or a hybrid message are just so many different types of audio message.

By virtue of this arrangement, it is easily possible to employ, by means of the central broadcasting module, mechanisms of superposition of audio messages as mentioned in the foregoing.

It will be noted that the notion of superposition is taken into account, for example, when it is a matter of determining whether an audio message in the course of being broadcast must be interrupted for the benefit of a new message of higher priority. In fact, if it is possible to superpose the two messages, then this solution must be given priority.

The aforementioned publication FR2918206 proposes instead a mechanism for managing specifically the interruption of an audio message between two elementary recordings, in order to favor the intelligibility of the message in the course of being broadcast as much as possible.

Thus, according to a particular characteristic, the said central broadcasting module comprises means for determining the advisability of superposing two concomitant audio messages according to the nature of the said two audio messages indicated in the configuration file, as well as means for superposing two audio messages according to the said determination. By virtue of this superposition, the aircraft crew is made aware of a larger number of simultaneous warnings.

In one embodiment of the invention, the said at least one configuration file associates, with each warning condition, an information item referred to as radio priority, indicating a warning priority relative to a radio communication function with which the said aircraft is equipped, and the said central broadcasting module is configured to adjust a sound volume for broadcasting of the audio message to be broadcast and a sound volume of the radio communication function according to the radio priority information item associated with the at least one priority warning condition.

By virtue of this arrangement, the invention improves the management of conflicts between the audio warnings and the radio communications of HF/VHF type within the aircraft. In this way the central broadcasting module is capable of dynamically attenuating certain audio warnings or the current radio communication, depending on the importance of one or the other.

Correlatively, the invention relates to a method for managing audio warning messages in an aircraft, comprising:

- steps for detecting, by a plurality of monitoring systems, the establishment of warning conditions,
- a step of broadcasting, by a central broadcasting module to which each of the monitoring systems is connected, of an audio message corresponding to a detected warning condition, characterized in that it comprises, at the said central broadcasting module, steps consisting in:

- determining at least one priority warning condition among the warning conditions detected by the monitoring systems, and
- generating at least one audio message corresponding to the at least one determined priority warning condition, in order to broadcast it.

The method has advantages similar to those of the management system described hereinabove, and especially the fact that, by centralizing the operations of determining pertinent warnings and of generating corresponding audio messages at a single equipment item of the system, it is possible to become free of using prior art analog cables and to improve the modifiability of the said equipment item of the system.

Optionally, the method may comprise steps relating to the system characteristics described hereinabove.

In particular, the method comprises a step of transmitting, from a said monitoring system to the said central broadcasting module, a broadcast request comprising an identification information item for a detected warning condition, this transmission being achieved over a digital communication network. In this case, the generation step is based on the received identification information item, if it corresponds to the determined priority warning.

Furthermore, it may be provided that the determination of at least one priority warning condition is a function of priority information items associated, in a configuration file local to the said central broadcasting file, with warning conditions detectable by the monitoring systems.

According to a particular characteristic, the method comprises a step of determining the advisability of superposing two concomitant audio messages according to information items relating to the nature of the said two audio messages and indicated in the configuration file, and a step of superposing two audio messages according to the said determination.

According to another characteristic, the said at least one configuration file associates, with each warning condition, an information item referred to as radio priority, indicating a warning priority relative to a radio communication function with which the said aircraft is equipped, and the method comprises a step of adjusting, by the said central broadcasting module, a sound volume of broadcasting of the audio message to be broadcast and a sound volume of the radio communication function according to the radio priority information item associated with the at least one priority warning condition.

The invention also relates to an aircraft comprising a system for managing audio warning messages such as described hereinabove.

Other features and advantages of the invention will become more apparent in the description hereinafter, illustrated by the attached drawings, wherein:

FIG. 1 shows an example of management of audio warning messages according to the prior art;

FIG. 3 illustrates a configuration file employed in the system of FIG. 2;

Figure 2:
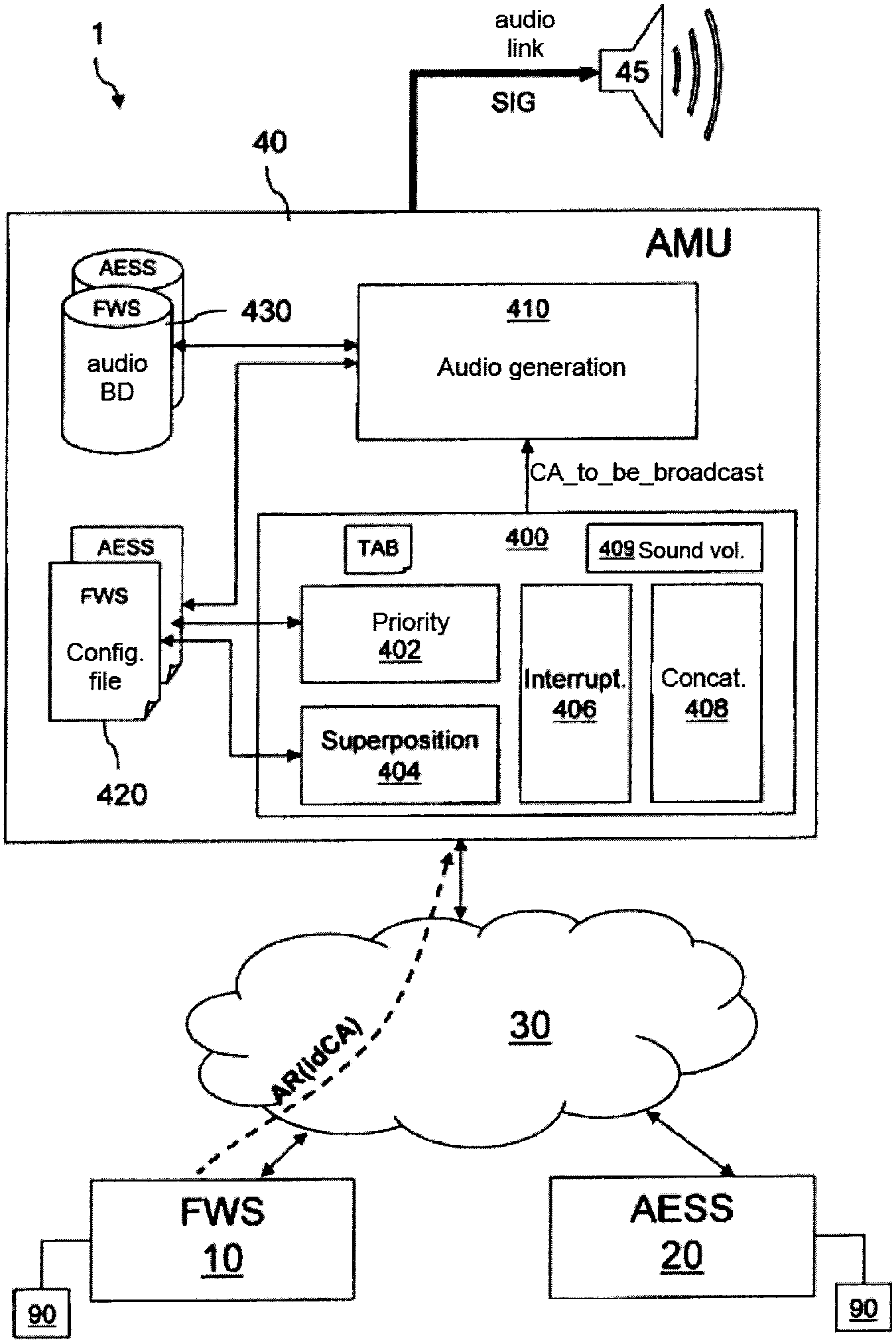
FIG. 2 shows an example of a system for managing audio warning messages according to the present invention.
Figure 5:
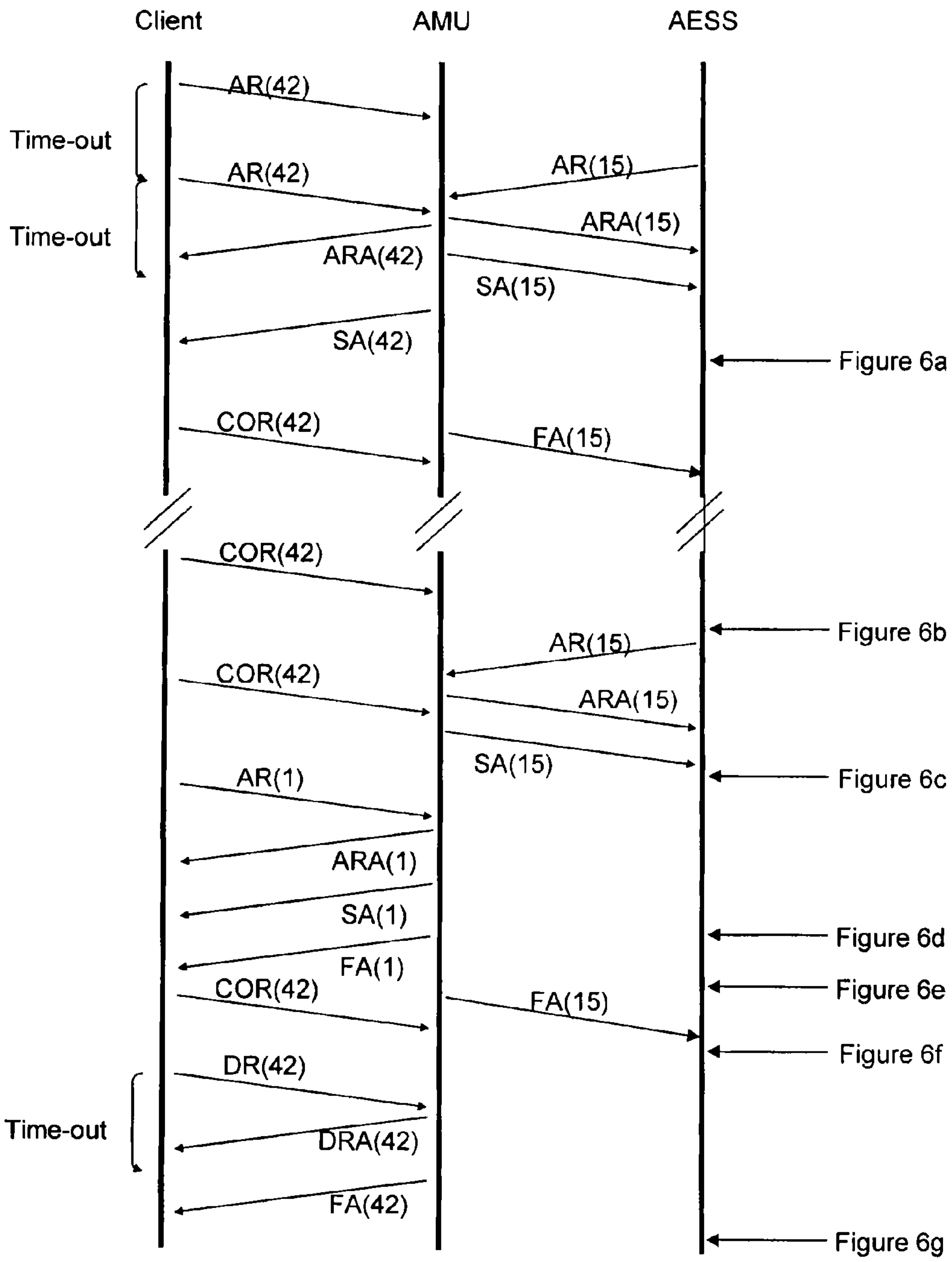

FIG. 5 illustrates, chronologically, an example of exchanges between the different entities of the management system of FIG. 2; and FIGS. 6*a* to 6*g* illustrate states of broadcasting of a management system according to FIG. 2, corresponding to certain moments of exchanges of FIG. 5, Referring to FIG. 2, a system 1 according to the invention for managing audio warning messages comprises monitoring systems, for example of the types alarm system type 10 (FWS) and integrated system 20 (AESS) for monitoring the external conditions.

FWS 10 and AESS 20 are constructed with embedded real-time electronics, which detect the states of the aircraft (parts, subassemblies, equipment items) and of its environment in real time. They are connected to one another and to the other on-board systems by an internal communication network 30.

Again referring to FIG. 2, a monitored system 90 is connected to flight warning system 10. The monitored system is, for example, a fuel gauge, a computer connected to an engine or a detector connected to a landing gear. Other monitored systems are of course connected to the AESS and/or to the FWS.

Monitoring systems 10, 20 comprise in particular a simple logic (software and/or hardware) arranged to detect different events relating to warning conditions CA and in particular to detect the establishment of a warning condition CA affecting one or more monitored systems 90 and/or external conditions. In particular, the monitoring systems identify each of the warning conditions established by an identifier idCA. As will be seen hereinafter, this identifier idCA of a warning condition also corresponds to an identifier of an audio warning message.

Management system 1 additionally comprises a central module 40 for broadcasting audio messages. This module, common to all of the monitoring systems, may assume the form of an AMU ("Audio Management Unit") and has as its function the management of audio emissions in the cockpit. To this end, it comprises an electronic audio card capable of generating an analog audio signal (for example, with the aid of a digital reader), and at least one analog audio output connected to one or more audio output peripherals 45 (speakers, headphones, etc.) within the aircraft and especially in the cockpit.

According to the invention, the said central broadcasting module comprises means for determining at least one priority warning condition among the warning conditions detected by the monitoring systems, and means for generating at least one audio message corresponding to the at least one detected priority warning condition, in order to broadcast it. In particular, the monitoring systems are arranged to send, to the central broadcasting module, via a digital communication means, here an internal network 30, at least one broadcast request comprising an identification information item for a detected warning condition. In this way a request is sent each time that a new warning condition is detected.

The requests for broadcasting of a new message corresponding to a detected warning are transmitted from monitoring systems 10, 20 to AMU 40 by way of digital network 30.

The invention therefore provides for employment of a simple digital communication protocol between AMU 40 and each of the monitoring systems capable of emitting warnings.

By way of illustration, the requests of the monitoring systems may be of several types:

- a request AR to initiate broadcasting, for asking AMU 40 to initiate the broadcasting of a new audio message (shown in FIG. 2). This request contains the identifier idCA of the locally detected warning condition CA or any other information item representative of the warning condition, to which the broadcast audio message will correspond;
- a request COP to continue broadcasting, emitted regularly at a period shorter than 500 ms, to tell AMU 40 to continue broadcasting an audio message corresponding to the identifier idCA indicated in this request;
- deactivation requests DR and cancellation requests CR, to stop the broadcasting of a message, especially according to the interruption principles described in publication FR2918206.

For its part, the AMU returns acknowledgments of reception of the request (ARA), of the start of emission of an audio message (SA) and of the end of emission of an audio message (FA), all identifying the warning condition CA in question, In this way, AMU 40 receives all of the requests of the different monitoring systems 10, 20.

Referring again to FIG. 2, for one employment of the invention, central broadcasting module 40 comprises a management module 400 for managing the rules for presenting audio messages and means 410, including in particular the electronic audio card, for generating at least one audio message.

Management module 400 identifies the audio message or messages to be broadcast and communicates information items with which they can be identified (in FIG. 2, the identifiers CA_to_be_broadcast) to means 410, which will generate them.

The determination and generation of audio messages to be broadcast are based in particular on configuration data 420 defining each of the warning conditions CA, and on one or more audio databases 430 comprising elementary audio recordings that will constitute the broadcast audio messages.

Configuration files 420 may assume the form of a database or of structured files. In particular, these are XML files, an example of which is given in FIG. 3.

These files and databases 420, 430 are loaded into the aircraft by traditional means for loading computer files.

In a preferred embodiment, central broadcasting module 40 comprises as many XML configuration files 420 as there are monitoring systems 10, 20 communicating with it. That makes it easy to manage (update, add, modify, etc.) each monitoring system.

Similarly, audio bases 420 may be segmented according to each monitoring system (for example, one base per system).

Referring to FIG. 3, an example of an XML configuration file 420 comprises a plurality of warning definitions 421 (element <warning>) having detailed characteristics in the attributes or child elements of the element <warning>.

The attribute "id" indicates the identifier of warning condition CA and therefore of the corresponding audio message. This is the identifier idCA referred to in the foregoing, which is transmitted in the exchanges between AMU 40 and monitoring systems FWS and AESS.

The attribute "owner" indicates the monitoring system corresponding to this warning. This attribute may be taken into account in particular if it is a matter of knowing whether superposition of audio messages may be achieved.

It will be noted that the identifier "id" may be unique over the entire management system 1. In addition, it is possible in particular to allocate distinct ranges of values for each of the monitoring systems, in which case the attribute "owner" may be omitted.

The field <PRIORITY> is a predefined static element that contains a corresponding warning priority level at the aircraft (in the example, level n having higher priority than level n+1). This priority is unique in particular over the entire management system 1. As will be seen hereinafter, this information item is taken into account when it is a matter of determining the highest-priority warning that it is appropriate to broadcast. It is also used to determine possible superpositions of audio messages and/or the interruption of the determination of audio messages.

In one embodiment, discontinuous ranges of priority values are reserved for each monitoring system, with unoccupied ranges reserved between them. By way of example, this allocation could result in:

values 1 to 99 unoccupied;
values 100 to 199 reserved for the FWS;
values 200 to 299 unoccupied;
values 300 to 399 reserved for the AESS; etc.

The unoccupied ranges are provided with a view to integrating new monitoring systems or new audio warnings of the AESS or of the FWS.

Taking these value ranges into account, the priorities used in configuration files 420 are not necessarily continuous.

The field <TYPE> specifies the nature (or type) of audio messages corresponding to the described warning. As introduced in the foregoing, it may concern in particular a message of "sound" type, of voice "synthesis" type or of "hybrid" type, which combines the two other types. As will be seen hereinafter, this information item about the type is used during operations of superposition of audio messages.

Monitoring system AESS 20 generally produces only warnings of the "synthesis" type.

The element <STRUCTURE> indicates how to construct the audio messages on the basis of elementary audio recordings stored in audio bases 430.

In the example of the figure, the audio warning message CRICKET STALL is composed of five elementary recordings (in WAV format) specified in the fields <ELEM_AURAL_MSG>;

STALL-STALL-[SILENCE]-CRICKET-[SILENCE], where CRICKET is an elementary "sound" and STALL is an elementary voice "synthesis".

The field <TIMING> indicates if the warning is "short" (single broadcast of the message) or "continuous" (broadcasting in a loop), and may indicate (in the "short" case) a period of repetitiveness for making the warning repetitive.

The element <AUTHORIZED_LEVELS> indicates the different sound levels that are possible for this warning, which levels can be manually selected by the crew (between attenuation or amplification according to environmental conditions—for example, when the engines are turning) or, as will be seen hereinafter, automatically.

The optional field <RADIO-PRIORITY> indicates a priority level of the warning compared with a radio communication function with which the aircraft is equipped. This information item permits AMU 40 to know the importance of a warning compared with a radio communication. As will be seen hereinafter, management system 1 according to the invention then makes it possible to control the sound level of warnings and radio communications dynamically according to their relative importance.

Other optional fields (not shown) may also be provided to increase the functions of the system: a field <INTERRUPTION> to indicate if the broadcast of a warning may or may not be interrupted; a field <SUPERPOSITION> to indicate that the warning may or may not be superposed on another warning; and a field <SILENCE> to specify the insertion of a silence before (negative value) or after (positive value) the warning in question, so as to make the warning more intelligible.

Returning to FIG. 2, management module 400 comprises means 402 for determining at least one priority warning condition among the warning conditions detected by the monitoring systems and received via the requests AR emitted by the monitoring systems.

In practice, the requests of monitoring systems 10, 20 are never simultaneous, so that management module 400 manages only one single request at a time, identified on the figure by the message AR(idCA). The other requests are in a buffer memory from the time they are received until they are processed.

Means 402 are therefore provided to compare the priority of the received warning with a priority threshold level (generally that of the warning in the course of being broadcast). Descriptions about the calculation of such a priority threshold are furnished in the aforementioned publication FR2918206; in particular, the current priority threshold associated with a warning in progress may be a priority attribute associated with the warning condition that led to initiation of the warning, possibly modified by other information items about the aircraft or its environment, which items may be transmitted in real time.

As will become apparent hereinafter, to achieve this comparison, means 402 access configuration files 420 to retrieve in particular the priorities <PRIORITY> associated with the warnings CA of the received requests.

The rule for presentation of warnings related to the priority information items is the following: the audio message corresponding to the "active" warning of highest priority (in the example, the priority value closest to 1) is broadcast. There is understood by active the warning that has been initiated by a monitoring system (by a request AR) and that is not terminated or deactivated or canceled (by a request DR or CR).

Management module 400 also comprises, optionally, all or part of the following modules: a module 404 for superposition of audio messages, a module 406 for interruption of broadcasting of audio messages and a module 408 for concatenation of audio messages.

Superposition module 404 comprises in particular means for determining the advisability of superposing two concomitant audio messages according to the nature <TYPE> of the two audio messages. By "concomitant" there is understood the fact that two messages have theoretical overlapping broadcasting periods (meaning that they are "active" at the same time). For this purpose, this module relies on configuration files 420 and retrieves the nature of a warning CA in the course of being processed.

This determination is made in particular between the message or messages in the course of being broadcast and the message corresponding to a new warning received in the course of being processed by management module 400.

By way of illustration, a rule for presentation of warnings related to superposition may be that only a message of "sound" type and a message of "synthesis" type may be superposed. In fact, the superposition of two sounds or of two vocally synthesized messages is detrimental: it is difficult to distinguish between two sounds emitted simultaneously or between two simultaneous voice information items. Nevertheless, more complex rules may be employed, especially permitting the superposition of more than two messages.

By centralizing these presentation rules in the single central broadcasting module 40, it is possible from now on to superpose a sound message and a voice synthesis message corresponding to two warnings detected by the same monitoring system.

Interruption module 406 makes it possible to undertake interruption of a message in the course of being broadcast, for example because the corresponding warning has ceased or because a more important warning has appeared. The aforementioned publication FR2918206 will be cited for more details about this function, and especially about the manner of choosing the moment of interruption (at the end of an elementary motif: a sound, a word, etc.).

Concatenation module 408 makes it possible to manage the insertion of silences between two consecutive message broadcasts, in order in particular to improve the overall comprehension of the messages. Predefined durations (if necessary indicated in the field <SILENCE> of configuration files 420) are applied.

In this way, management module 400 continuously determines, on the basis of these presentation rules relating to priorities, to superposition, to interruption and to concatenation, the warnings to be broadcast, and it transmits, also continuously, the identifiers thereof (CA_to_be_broadcast in FIG. 2) to audio generation means 410.

Knowing these identifiers, audio generation means 410 retrieve, in configuration files 420, the structure <STRUCTURE> of the messages to be broadcast, then, in audio bases 430, the elementary recordings for composing the messages to be broadcast. If certain messages are already in the course of being broadcast, means 410 are able to continue broadcasting them without accessing files 420 and audio bases 430 once again.

These recordings are then read by the electronic audio card, taking into account principles of superposition and interruption as the case may be, to permit the broadcasting of sound messages SIG to the cockpit speakers.

According to a particular characteristic, audio generation means 410 also retrieve the "radio priority" information items <RADIO_PRIORITY" associated with the warnings CA_to_be_broadcast, as well as the current level of radio vigilance.

Traditionally two listening states (level of vigilance) exist concerning the radio communications:

the radio watch: the sound volume of the communication is at the minimum. The pilot is aware of all of the radio calls, but he pays attention only to the calls in which the identifier of his airplane is cited. He must then turn up the sound level to listen to the rest of the communication;

normal listening: the volume is at a normal listening level.

Predefined rules are applied to these two retrieved information items in order to determine if there is or is not reason to turn up the sound level of the warnings and/or of the radio communication.

Thus, depending on the radio priority indicated for the audio message to be broadcast and the current vigilance (for example, by direct comparison between these two values if that is possible), audio generation means 410 are able to attenuate (respectively amplify) the message to be broadcast by choosing an appropriate option <AUTHORIZED_LEVELS> and running the radio communication equipment via audio control module 409, in order to increase (respectively reduce) the radio sound volume.

For example, a warning BUZZER_NORM (signifying that the cabin crew wishes to communicate with the cockpit crew) may have low "radio priority" importance attributed to it in configuration file 420. Thus, during radio communication in "normal listening", the buzzer volume may be attenuated to ensure that it does not impair communication.

In another example, if the crew has selected a "radio watch" state and an audio warning is emitted, the radio volume may be substantially increased automatically (while taking care to preserve proper overall intelligibility).

This dynamic control of the sound volume of radio communications and of audio warnings makes it possible in particular to reduce the problems caused by untimely emission of these warnings or the use of a radio with sound volume too high.

Figure 4:
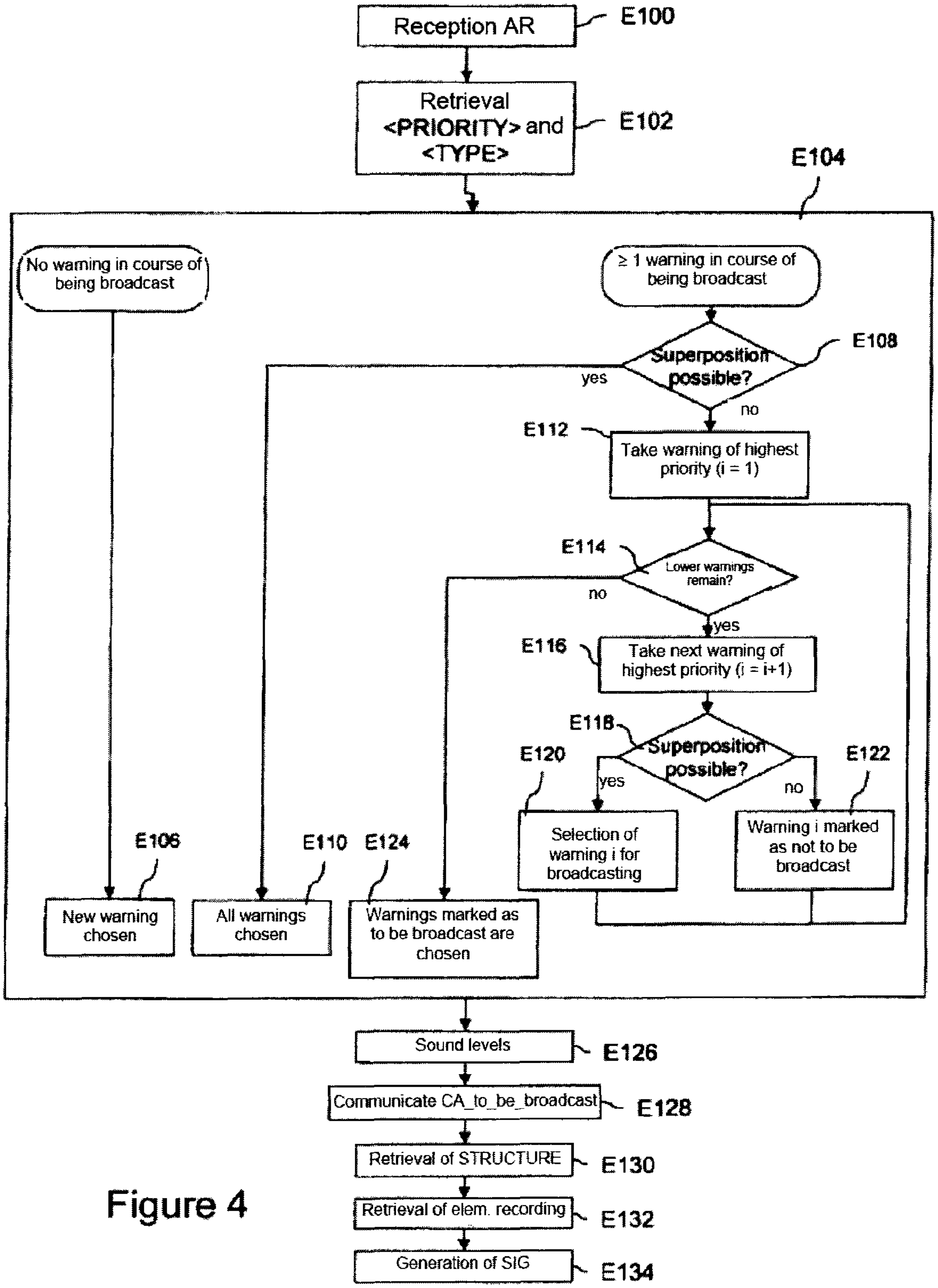
FIG. 4 shows, in the form of a logic diagram, main steps for the management of audio warning messages in the central broadcasting module of FIG. 2.

FIG. 4 schematically illustrates the main processing steps that take place in centralized broadcasting module 40, and especially during reception of a broadcasting request AR.

The processing of the requests COR, DR and CR is not described in detail here. Concerning the interruption of a broadcast following a request DR or CR, the publication FR2918206 will be cited. As regards the requests COR, they make it possible, when management module 400 takes the field <TIMING> of a warning into account, to continue broadcasting this warning if the monitoring system that detected this warning continues to emit requests COR. In the absence of such a received request within a given time (such as 500 ms), management module 400 terminates broadcasting of the corresponding warning.

In these cases, the warning of highest priority that has not been canceled, deactivated or terminated (referred to as "active" warning) is then broadcast. It should be noted that management module 400 is able to update a table TAB or equivalent referencing all of the "active" warnings: an entry is added to this table when a request AR is received; then this entry is removed when the warning has been completely broadcast (case of a short warning after the N repetitions, N≥1), when a request DR, CR for the same warning identifier is received or when no request COR is received within 500 ms.

In particular, each entry of the table TAB may indicate the corresponding identifier idCA, the corresponding <TYPE> and the corresponding <PRIORITY> (which are used as described hereinafter), as well as a marker (or flag) indicating that the warning is in the course of being broadcast.

Referring to FIG. 4, the module receives, in step E100, a broadcast request AR including the identifier idCA of a warning condition CA detected by the monitoring system emitting the request.

In step E102, management module 400 retrieves the priority information items <PRIORITY> and type information items <TYPE> corresponding to the received identifier idCA. It inserts a new corresponding entry into the table TAB.

In step E104, it compares these retrieved information items with those stored in memory for the warning or warnings in the course of being broadcast at the table TAB (entries with the broadcast marker equal to true), in order to determine if the new warning CA must be broadcast in turn.

This step applies the presentation rules described in the foregoing, especially as regards priorities and superposition.

In particular, if no warning is in the course of being broadcast, the newly detected warning CA is chosen to be broadcast (the corresponding broadcast marker set to "true" in the table TAB—step E106).

If at least one warning is in the course of being broadcast, superposition module 404 determines (E108) if the new warning may be superposed with this at least one warning. If yes, these warnings are then chosen to be broadcast (E110).

If no, priority module 402 takes (E112) the warning of highest priority among the warnings listed in the table TAB and selects it as being a warning to be broadcast (broadcast marker set to "true" in the table TAB).

It is easy to place the warnings of the table TAB in order according to their priority values indicated in files 420 or in the table TAB. The warning of highest priority is assigned i=1.

Module 402 then determines (E114) if a warning of priority lower than the current level i remains.

If this is the case, it takes (E116) the next warning of highest priority: i=i+1; then it determines (E118) if it is possible to superpose this next warning with the already selected warnings to be broadcast.

In the affirmative, this alert is selected (E120) as being to be broadcast (the broadcast marker set to "true" in the table TAB), then a return to step E114 takes place.

In the negative, the current warning i is not retained as a warning to be broadcast (the broadcast marker set to "false" in the table TAB) during step E122, then a return to step E114 takes place.

Finally, when no more warnings of lower priority remain (output no in step E114), the warnings marked as to be broadcast in the table TAB are chosen (E124).

In our example hereinabove, there exists only one case of superposition of warnings involving at most two messages: a "sound" message and a "synthesis" message. As defined hereinabove, the invention nevertheless applies to more complex superpositions, in which a large number of audio messages may be emitted simultaneously: for example, a plurality of audio messages at a plurality of different audible frequencies (necessitating the use of bandpass filters during reception in order to retrieve each message selectively).

Following steps E106, E110 and E124, management module 400, via module 409, determines (E126) the sound levels to be applied to the audio warning messages (choice of LEVEL) and to be applied to the radio communications, by using the information item RADIO_PRIORITY and the radio vigilance levels. It then controls the sound level of the radio communications dynamically.

Thereafter, in step E128, management module 400 communicates to audio generation module 410 the identifier or identifiers CA_to_be_broadcast of the warnings to be broadcast corresponding to the entries of the table TAB whose broadcast marker is at true, accompanied by the sound level LEVEL to be applied.

It is recalled that, in parallel, the mechanisms for interruption of a warning or for the end of broadcasting of a warning may also come to modify these markers in the table TAB. A communication similar to that of step E128 is then effected upon each update of at least one marker of the table TAB.

In step E130, central module 400 retrieves, from configuration files 420, the composition <STRUCTURE> of the messages to be broadcast as well as their field <RADIO_PRIORITY>.

In step E132, the elementary recordings listed in the retrieved compositions are in turn retrieved from bases 430.

In step E134, audio generation means 410 proceed to read the audio warning messages corresponding to the retrieved recordings.

It should be noted that, if certain of the broadcasts in progress must be interrupted in order to broadcast new messages, these broadcasts are interrupted by employing, for example, the interruption principles described in the publication FR2918206.

As follows from the foregoing, the present invention proposes centralized management of audio warnings. The structuring of configuration files 420 and/or audio databases 430 makes it possible to add, update or delete a monitoring system easily.

Thus, to add a new monitoring system, it is simply necessary to:

add a new base 430 of warnings in AMU 40;

add a new configuration file 420 in the AMU; and reallocate the ranges of priorities for this new monitoring system.

FIGS. 5 and 6 illustrate an example of employment of the invention during successive detection of several warnings in FWS system 10 and AESS system 20. FIG. 5 shows the exchanges between the different entities of management system 1 and FIGS. 6*a* to 6*g* illustrate the broadcasting states corresponding to certain moments of the exchanges of FIG. 5.

In this illustration of the invention, central module AMU 40 employs one buffer memory per type of warning (especially by placing the warnings listed in the table TAB in order).

FWS system 10 first of all emits a request AR for a "sound" warning BUZZER (of continuous duration) having a priority equal to 42, which it reiterates in the absence of reception of an acknowledgment ARA(42) followed by confirmation of the start of broadcasting SA(42).

Figure 6A:
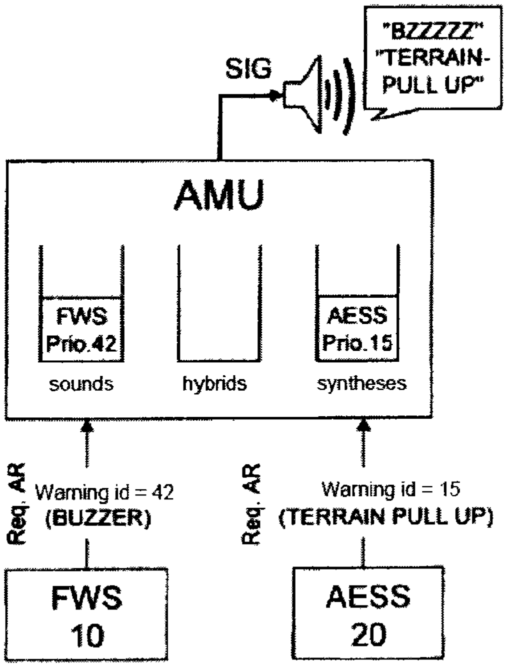

In quasi-simultaneous manner, AESS system 20 emits a request AR for broadcasting of a "synthesis" warning TERRAIN PULL UP of priority 15. Acknowledgment ARA(15) and confirmation of broadcasting SA(15) are received by the AESS system. FIG. 6*a* illustrates the state of the system at that moment with superposed broadcasting of the two messages.

Figure 6B:
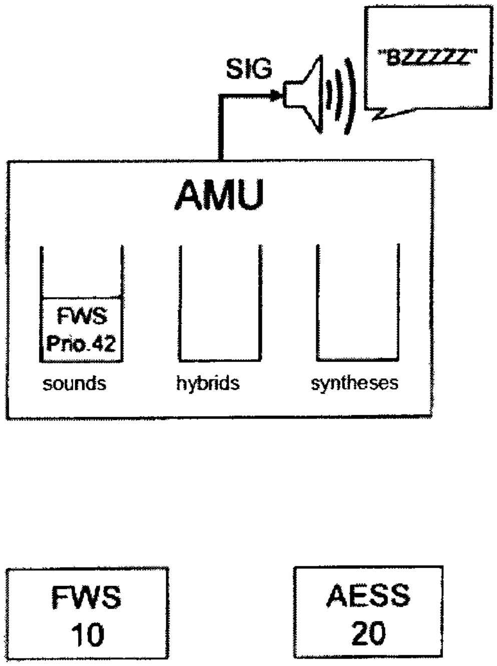

The warning TERRAIN PULL UP is broadcast entirely (message FA(15) for end of broadcasting) while the FWS system emits requests COR(42) to continue broadcasting of the warning BUZZER. FIG. 6*b* then illustrates the state of the system at that moment, the warning BUZZER being the only warning still to be broadcast.

Figure 6C:
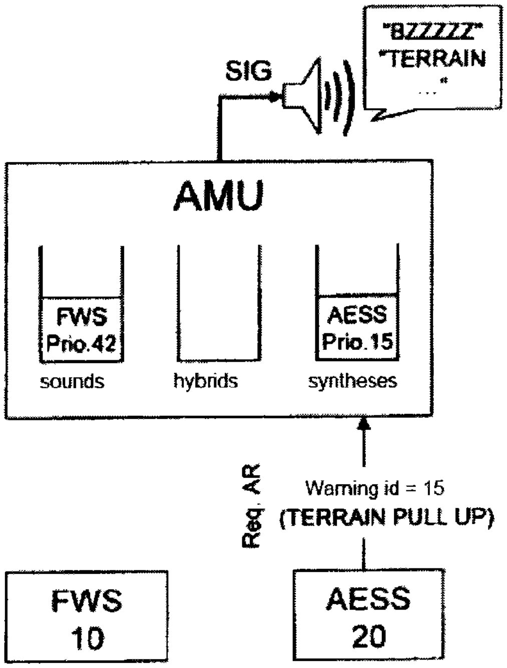
Figure 6D:
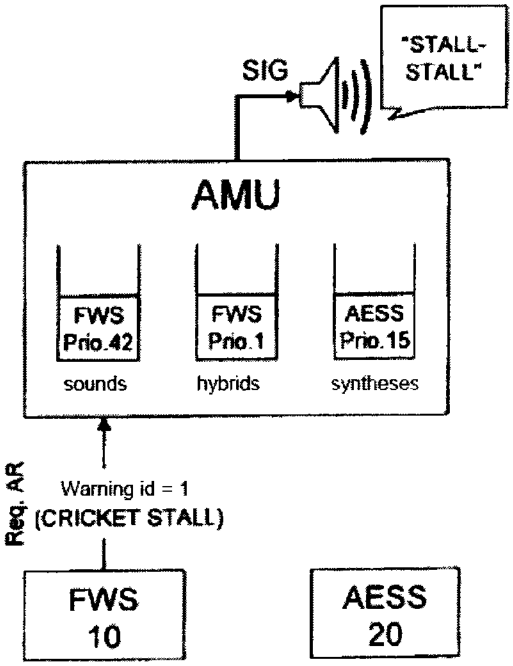

The AESS system once again emits a request for broadcasting of the warning TERRAIN PULL UP, central module AMU 40 then commencing to generate the voice synthesis audio message (FIG. 6*c*).

At that moment, a request of the FWS system for broadcasting of a priority warning CRICKET STALL (maximum priority 1) is received, which warning is of "hybrid" type. It has the consequence of interrupting the broadcasting of the warnings BUZZER and TERRAIN PULL UP, as is evident from FIG. 6*d*, where only the warning CRICKET STALL is being broadcast.

Figure 6E:
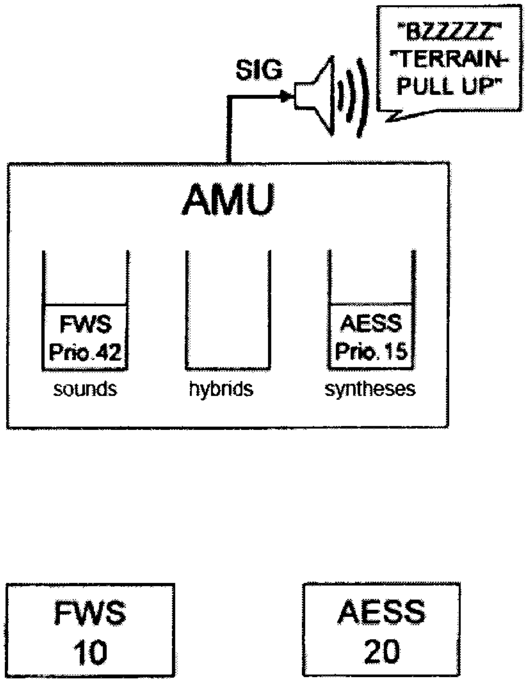

Since broadcasting of the warning CRICKET STALL is ending (message FA(1)), management system 1 is restored to the state of FIG. 6*e*, where the warning TERRAIN PULL UP is emitted in superposition with the warning BUZZER.

Figure 6F:
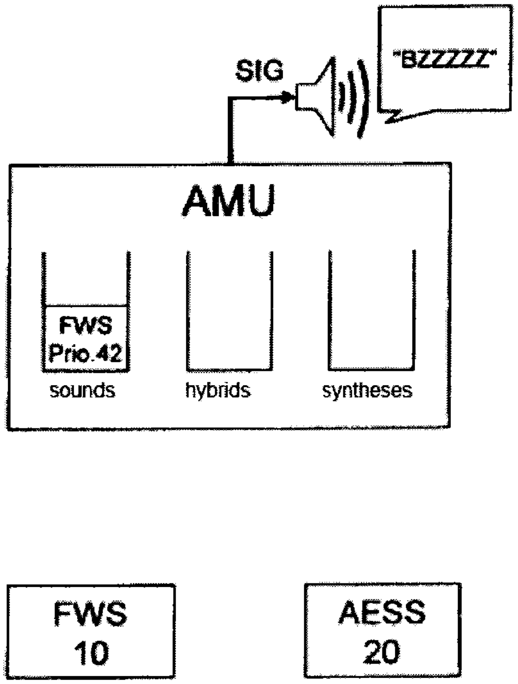

In the state of FIG. 6*f*, emission of the warning TERRAIN PULL UP ends (message FA(15)), only the warning BUZZER remaining by virtue of the continuation requests COR(42).

Figure 6G:
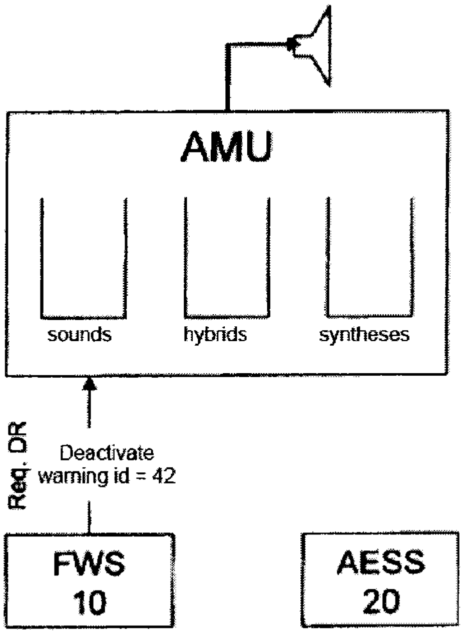

Finally, the FWS system emits a request DR(42) to deactivate the warning BUZZER, for example because the conditions for initiation of this warning are no longer satisfied. After acknowledgment DRA(42) and FA(42) by the central module AMU, the system no longer broadcasts any warning (FIG. 6*g*).

The foregoing examples are merely some embodiments of the invention, which is not limited thereto.

In particular, monitoring systems 10, 20, central module 40 and communication network 30 may be made individually redundant in order to ensure, in the event of failure of one of them, perpetuity of the functions that they employ.

The centralized management of audio warnings according to the invention makes it possible to personalize the contents of the audio messages easily. Thus it is envisioned to have a plurality of audio databases 430, each of which is in a particular language or according to a masculine or feminine voice. In this way, by means of a simple interactive configuration command, it is possible to switch instantaneously from one of these modes (languages, voices) to the other.

The invention claimed is:

1. A system for managing audio warning messages in an aircraft, comprising:

a plurality of monitoring systems; and a central broadcasting module, to which each of the monitoring systems is connected, wherein each of the monitoring systems is configured to detect establishment of at least one warning condition and to send to the central broadcasting module, via a digital communication medium, at least one broadcast request comprising an identification information item for a detected warning condition, and wherein the central broadcasting module is configured to broadcast a new audio warning message corresponding to the detected warning condition, the central broadcasting module including:

determining circuitry configured to determine at least one priority warning condition among warning conditions detected by the monitoring systems;

generating circuitry configured to generate the new audio warning message, which corresponds to the at least one determined priority warning condition, for broadcast;

at least one configuration file that associates, for each warning condition capable of being detected by the monitoring systems:

an information item for identification of the warning condition, an audio definition of a message for generating at least one audio warning message corresponding to the warning condition, and a priority information item, on the basis of which the central broadcasting module determines the priority warning condition;

determining circuitry configured to determine advisability of superposing the new audio warning message and a concomitant audio warning message according to a nature of each of the two audio warning messages indicated in the at least one configuration file; and superposing circuitry configured to superimpose the two audio warning messages according to a determination by the determining circuitry that one of the two audio warning messages is a sound type audio warning message and the other of the two audio warning messages is a synthesis type audio warning message.

2. A system according to claim 1, wherein the central broadcasting module includes a plurality of said configuration files associated respectively with each monitoring system.

3. A system according to claim 1, wherein the central broadcasting module is configured to determine the at least one priority warning condition from priority information items corresponding to the identification information items received from the monitoring systems.

4. A system according to claim 1, wherein the at least one configuration file associates, with each warning condition, an information item relating to the nature of the corresponding audio warning message.

5. A system according to claim 1, wherein the at least one configuration file associates, with each warning condition, a radio priority information item indicative of a warning priority relative to a radio communication function with which the aircraft is equipped, and the central broadcasting module is configured to adjust a sound volume for broadcasting the new audio warning message to be broadcast and a sound volume of the radio communication function according to the radio priority information item associated with the at least one priority warning condition.

6. A method for managing audio warning messages in an aircraft, comprising:

detecting, by a plurality of monitoring systems, establishment of warning conditions, transmitting, from the monitoring systems over a digital communication network to a central broadcasting module, to which each of the monitoring systems is connected, broadcast requests comprising an identification information item for a detected warning condition, and broadcasting, by the central broadcasting module, a new audio warning message corresponding to the detected warning condition, wherein the central broadcasting module includes at least one configuration file that associates, for each warning condition capable of being detected by the monitoring systems:

an information item for identification of the warning condition, an audio definition of a message for generating the new audio warning message corresponding to the warning condition, and a priority information item, wherein the method further comprises, at the central broadcasting module:

determining, from the identification information item of the broadcasting requests and from priority information items of the at least one configuration file, at least one priority warning condition among the warning conditions detected by the monitoring systems, and generating, by the audio definition of the at least one configuration file, at least one audio warning message corresponding to the at least one determined priority warning condition for broadcast, determining advisability of superposing the new audio warning message and a concomitant audio warning messages according to information items relating to a nature of each of the two audio warning messages indicated in the at least one configuration file; and superposing the two audio warning messages when said determining determines that one of the two audio warning messages is a sound type audio warning message and the other of the two audio warning messages is a synthesis type audio warning message.

7. A method according to claim 6, wherein the at least one configuration file associates, with each warning condition, a radio priority information item that indicates a warning priority relative to a radio communication function with which the aircraft is equipped, and wherein the method further comprises adjusting, by the central broadcasting module, a sound volume of broadcasting of the new audio warning message to be broadcast and a sound volume of the radio communication function according to the radio priority information item associated with the at least one priority warning condition.

8. An aircraft comprising a system for managing audio warning messages according to one of claims 1 to 4 or 5.

9. A system according to claim 1, wherein, when the warning condition associated with the new audio warning message, which is currently being broadcast, is lower than a warning condition associated with a broadcast request for the concomitant audio warning message sent after the broadcast request of the new audio warning message, the superposing circuitry superposes the new audio warning message and the concomitant audio warning message upon the determination that the two audio warning messages can be superposed.

10. A method according to claim 6, wherein, when the warning condition associated with the new audio warning message, which is currently being broadcast, is lower than a warning condition associated with a broadcast request for the concomitant audio warning message sent after the broadcast request of the new audio warning message, superposing the new audio message and the concomitant audio warning message responsive to the determination that the two audio warning messages can be superposed.

11. A system for managing audio warning messages in an aircraft, comprising:

a plurality of monitoring systems; and a central broadcasting module, to which each of the monitoring systems is connected, wherein each of the monitoring systems is configured to detect establishment of at least one warning condition and to send to the central broadcasting module, via a digital communication medium, at least one broadcast request comprising an identification information item for a detected warning condition, and wherein the central broadcasting module is configured to broadcast a new audio message corresponding to the detected warning condition, the central broadcasting module including:

determining circuitry configured to determine at least one priority warning condition among warning conditions detected by the monitoring systems;

generating circuitry configured to generate the new audio message, which corresponds to the at least one determined priority warning condition, for broadcast; and at least one configuration file that associates, for each warning condition capable of being detected by the monitoring systems:

an information item for identification of the warning condition, an audio definition of a message for generating at least one audio message corresponding to the warning condition, and a priority information item, on the basis of which the central broadcasting module determines the priority warning condition, wherein the at least one broadcast request is a request to continue broadcasting the new audio message for the detected warning condition following a previous broadcast request to initiate broadcasting the new audio message, determining circuitry configured to determine advisability of superposing the new audio message and a concomitant audio message according to a nature each of the two audio messages indicated in the at least one configuration file, and superposing circuitry configured to superimpose the two audio messages according to a determination by the determining circuitry that one of the two audio messages is a sound type audio message and the other of the two audio messages is a synthesis type audio message.

12. A system according to claim 11, wherein, when the warning condition associated with the new audio message, which is currently being broadcast, is lower than a warning condition associated with a broadcast request for another new audio message sent after the broadcast request of the new audio message, superposing the new audio message and the another new audio message when the superposition circuitry of the central broadcast module determines that the two new audio messages can be superposed.

* * * * *